Dec. 8, 1959         M. G. VOHLAND              2,916,207
                   CELESTIAL FIX PLOTTER
Filed Jan. 8, 1958                        4 Sheets-Sheet 2
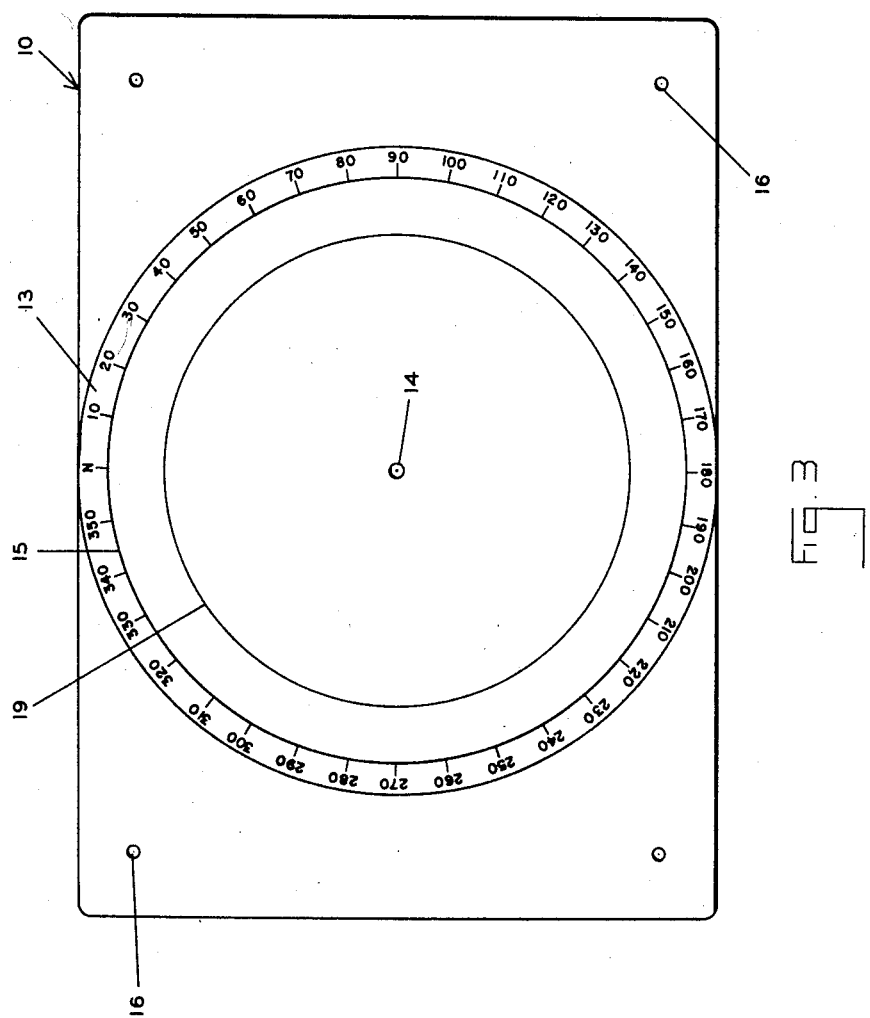
INVENTOR.
MARION  G.  VOHLAND
BY
Jerome R. Cox
ATTORNEY Dec. 8, 1959   M. G. VOHLAND   2,916,207
CELESTIAL FIX PLOTTER
Filed Jan. 8, 1958   4 Sheets-Sheet 3
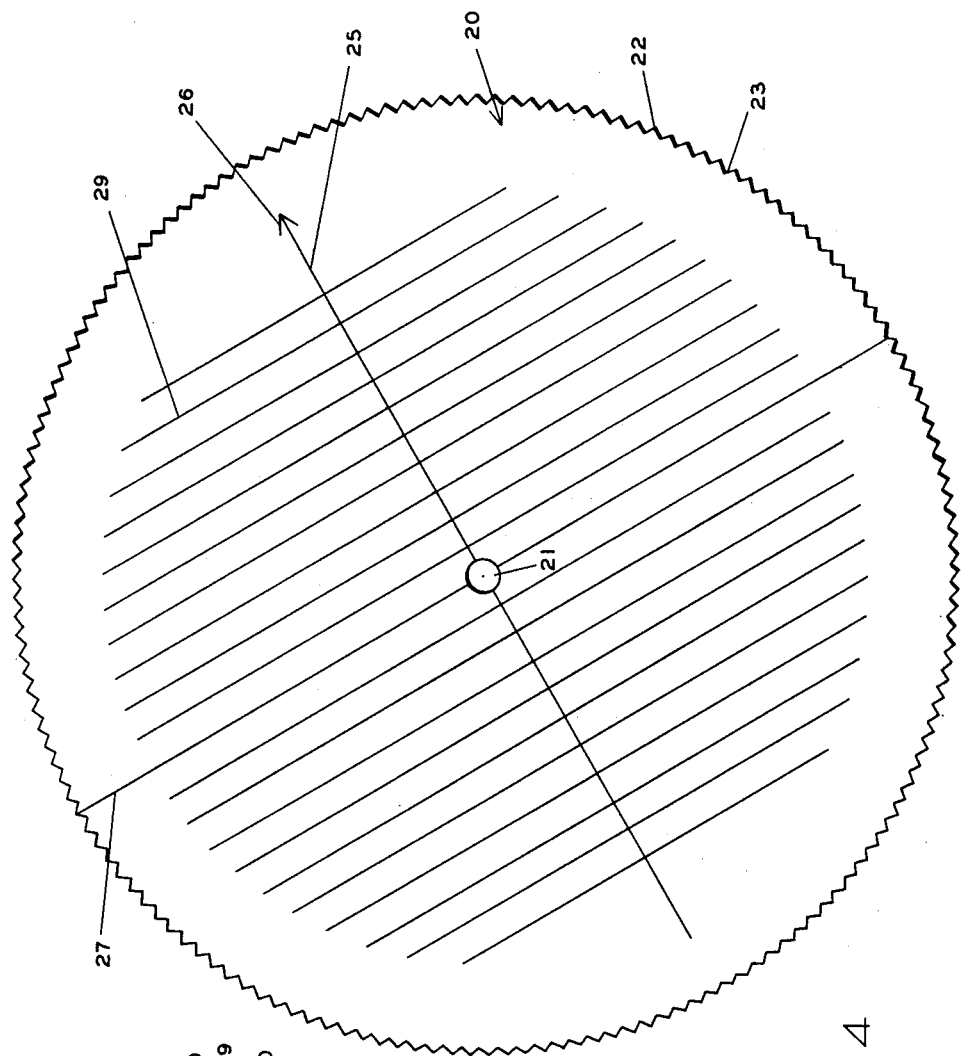
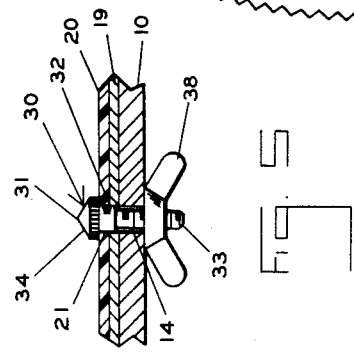
INVENTOR.
MARION G. VOHLAND
BY
Jerome R. Cox
ATTORNEY

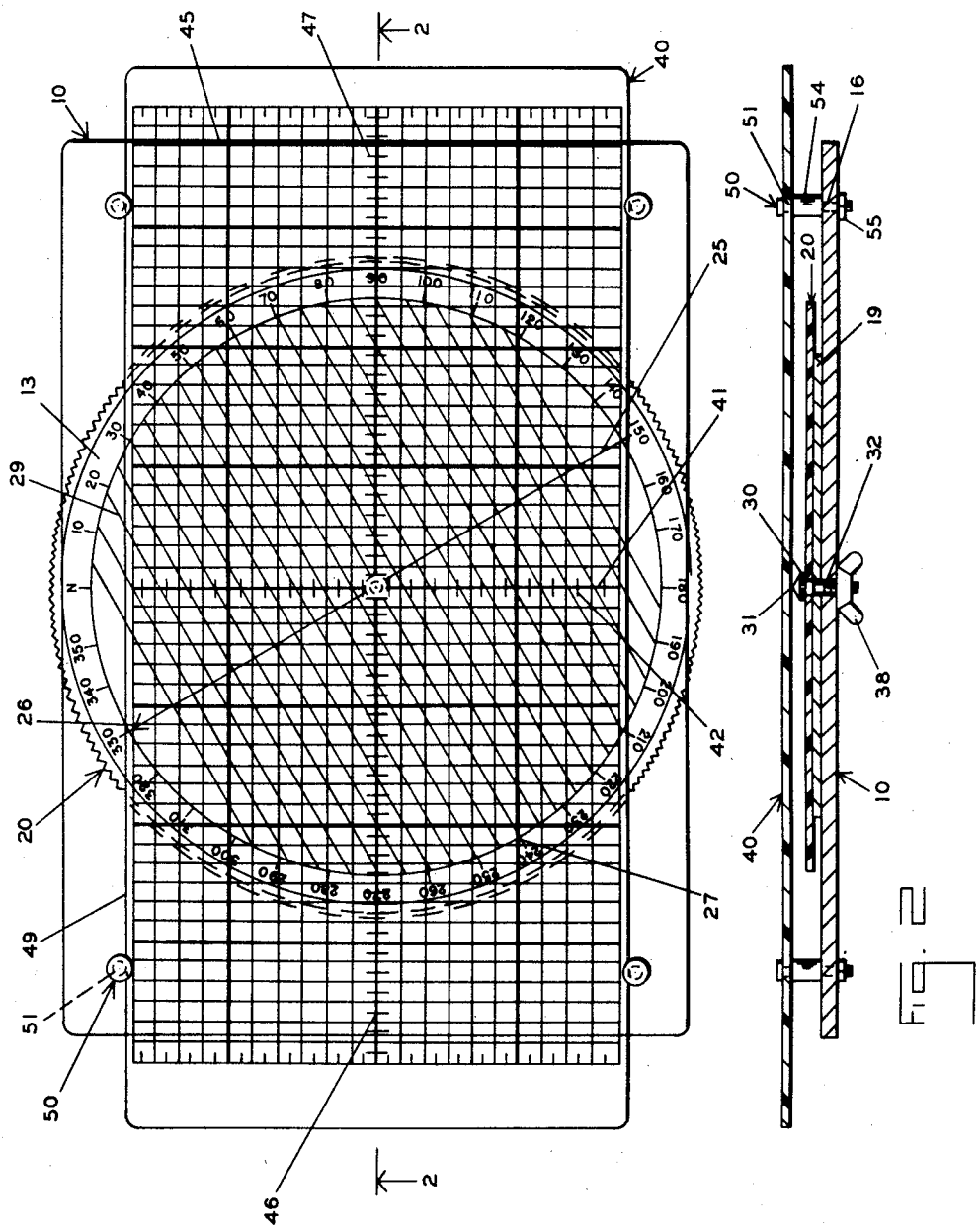

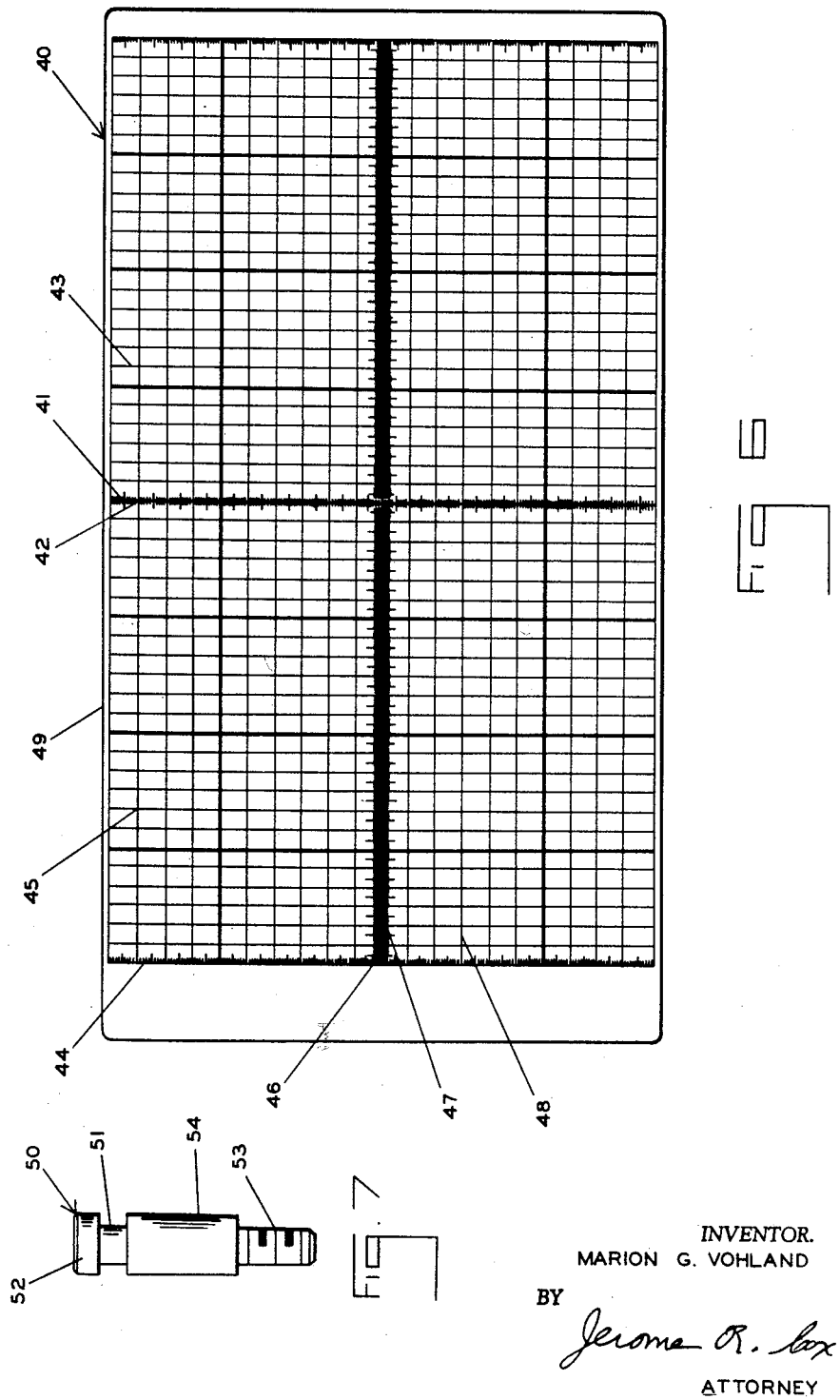

United States Patent Office 2,916,207
Patented Dec. 8, 1959

2,916,207
CELESTIAL FIX PLOTTER
Marion G. Vohland, Clarksburg, Ind.
Application January 8, 1958, Serial No. 707,749
13 Claims. (Cl. 235—61)

The invention disclosed herein and illustrated in the appended drawings relates generally to navigating instruments and more particularly to instruments for computing a geographical position from data obtained by observing celestial bodies.

In the celestial navigation of ships and aircraft it is the usual practice to plot data, derived from the observed azimuth and altitude bearings of celestial bodies, directly upon maps or charts of the appropriate area of the earth's surface; and to compute therefrom, directly upon the charts, the position of a final and corrected navigational fix. Such procedure ordinarily requires the use of dividers and/or appropriate plotting tools together with a plurality of sectional maps or charts showing various types of projections (as for example Mercator's projection) of the area over which a course is to be determined.

This procedure is usually followed in this navigation of present-day aircraft of intercontinental range especially where celestial navigation is required across extensive water areas and other areas which lack alternative navigational aids. Due to the increasingly high cruising speeds and the extreme space economy which are characteristic of such aircraft, effective in-flight navigational operations on such aircraft, must be performed rapidly and within a severely limited operating space. Thus each factor which tends to complicate such operations serves to render the resulting navigational data subject to a higher probability of error and less effective as a reliable and timely navigational aid.

The device of my invention enables a navigator to compute and to plot a reliable corrected celestial fix in terms of exact latitude and longitude without the use of extensive navigational charts and cumbersome plotters or dividers.

Objects

One of the objects of my invention is to provide a navigational instrument for rapidly computing and plotting an accurate celestial fix in terms of exact latitude and longitude in an environment having severely restricted space limitations.

Another object of my invention is to provide an instrument for computing and plotting such a celestial fix without reference to conventional navigational charts.

A further object of my invention is to provide an instrument for computing and plotting such a celestial fix without the use of dividers or other extraneous measuring tools.

A further object of my invention is to provide an instrument for determining an accurate celestial fix of such character which is compact in design, efficient in operation, and more practical for use in the restricted quarters of modern long-range aircraft.

A further object of my invention is to provide means for and methods of rapidly and accurately computing the optimum course, and the distance along such course, to a desired destination from a previously established navigational fix.

A further object of my invention is to provide means for more rapidly replotting and analyzing the navigational aspects of important strategic combat type aerial missions.

Further objects and features of my invention will be apparent from the subjoined specification and claims when considered in connection with the attached drawings.

Drawings

In the drawings which illustrate one specific embodiment of my invention:

Fig. 1 is a top plan view of the instrument of my invention;

Fig. 2 is a view in section taken along the line 2—2 of Fig. 1;

Fig. 3 is a top plan view of the base plate only, with other parts removed;

Fig. 4 is a top plan view of the azimuth and range indicator only, with other parts removed;

Fig. 5 is a fragmentary view, on an enlarged scale, showing the pivot bolt of Fig. 2 in full with other parts broken away;

Fig. 6 is a top plan view of the plotting grid only, with other parts removed; and Fig. 7 is a view on an enlarged scale, of the guide post of Figs. 1 and 2 with other parts omitted.

Briefly stated, the navigating instrument of my invention consists of a base plate member 10, a disk member 20 rotatably secured thereto, and a transparent plotting board 40, positioned superadjacent the disk member and slidably secured to the base plate.

Referring to the drawings for a detailed description of my invention, it will be seen that I have shown in Figs. 1 and 2 an instrument for computing and plotting a celestial navigational fix comprising a base plate 10; disk member 20; pivot bolt 30 which pivotally interengages both disk 20 and plate 10; plotting board 40 positioned superadjacent disk 20, slidably secured to plate 10, and repositionable along one of its central axes; and a plurality of guide posts 50 secured to plate 10 and in frictional engagement with opposite edges of board 40; each of said elements being described hereafter in detail.

Base plate member 10 is formed from any suitable material with the generally rectangular configuration shown in Fig. 3. Centrally positioned upon the upper face of plate 10 is a circular azimuth scale 13 which is preferably graduated in whole degrees. Scale 13 may be engraved or otherwise delineated directly upon the surface of plate 10; or alternatively, scale 13 may be formed of suitable material and fixedly secured by appropriate means to the surface of plate 10. Plate 10 is also provided with central bore 14, centrally located within the circle of graduations 15 of scale 13, and a plurality of bores 16 suitably located within plate 10 for positioning guide posts 50 (see Figs. 1 and 2) in cooperative engagement with opposite edges of plotting board 40 as described hereafter in detail. A felt pad 19 of suitable configuration is arranged concentrically about bore 14 and within graduations 15 of scale 13 and is secured by appropriate adhesive means to the upper surface of scale 13. It is formed with a central opening registering with central bore 14 of plate 10.

Disk member 20 (Figs. 1, 2 and 4) serves as an azimuth and range indicator and is formed, from any suitable material, so as to have the general circular configuration shown in the drawings. Member 20 is preferably formed of transparent material in order that scale 13 of base plate 10 can be observed by looking through member 20.

Azimuth index line 25 extends diametrally across one face of disk 20 and is provided adjacent one of its opposite ends with an arrow-head or other suitable azimuth indicator 26. Central reference line 27 intersects line 25 at the midpoint of disk 20 and extends diametrally across disk 20, perpendicular to index line 25. A plurality of mutually parallel reference lines 29 are delineated upon disk 20 parallel to central reference line 27. Lines 29 intersect line 25 at equal intervals spaced outwardly from the central point of intersection of lines 25 and 27. The interval at which lines 29 are equally spaced along line 25 is equal to a predetermined number of nautical miles as measured (allowing approximately one nautical mile per minute of great circle arc) along the central meridian of plotting grid 45 (Fig. 6) which is described hereafter in detail. Although the interval between adjacent lines 29 may be equal to any predetermined number of nautical miles as measured on the latitude scale of grid 45, I prefer to provide an interval of five nautical miles which is generally considered for navigational purposes to be equivalent to five minutes of latitude.

Member 20 is further formed with pivotal opening 21 in axial alignment with the point of intersection of index 25 and central line 27. Opening 21 has a diameter substantially equal to that of bore 14 in plate 10. Member 20 is arranged in face to face engagement with felt pad 19 (Fig. 2) and is rotatably secured to plate 10 by means of pivot bolt 30 and cooperating wing-nut 38 described hereafter. Member 20 preferably has a diameter sufficient to permit its circumferential edge 22 to extend beyond at least one edge of plate 10 when bore 21 is axially aligned with bore 14 of plate 10. Edge 22 of member 20 is formed with a plurality of knurls 23 to facilitate manual movement of the overhanging edge 22 of disk 20 just described.

Pivot bolt 30 is formed with the general configuration seen in Fig. 5, having an upper shank portion 32, lower threaded portion 33, and head 34. Upper shank 32 has a diameter sufficient for being snugly but pivotally received in opening 21 of disk 20. Head 34 is formed in the general shape of Fig. 5 with central apex 31 positioned on the axis of bolt 30 for indicating the point of intersection of index line 25 and central reference line 27 when bolt 30 is in the position shown in Figs. 1 and 2, in pivotal interengagement with disk 20 and plate 10. Wing-nut 38 has suitable threads for engaging threaded portion 33 of bolt 30 and serves as a means for adjusting the degree of frictional interengagement between the lower face of disk 20 and the upper face of felt pad 19 so as to permit disk 20 to be manually rotatable with respect to pad 19 and plate 10 while at the same time preventing accidental displacement of disk 20 when it has been positioned at a desired setting with respect to azimuth scale 13 on plate 10.

Plotting board 40 is formed from suitable transparent rigid material with the generally rectangular configuration shown in Fig. 6. Delineated upon the lower surface of board 40 is rectangular grid 45 comprising central meridian 41, central parallel 46, a plurality of meridian lines 43, and a plurality of parallels 48. Central parallel 46 is centrally positioned on board 40 and extends longitudinally thereof. Central meridian 41 is positioned perpendicular to parallel 46 and extends transversely of board 40. Meridian lines 43 are arranged parallel to and coextensive with central meridian 41 and are spaced at equal intervals on opposite sides thereof as measured along central parallel 46. Parallels 48 are arranged perpendicular to central meridian 41, are coextensive with central parallel 46 and are spaced at equal intervals on opposite sides of central parallel 46, as measured along central meridian 41.

The interval between mutually adjacent parallels 48 bears a ratio to the interval between mutually adjacent meridians 43 equal to that which exists adjacent the mid-parallel of latitude which passes through a Mercator's projection of the particular area of the earth's surface over which the device is intended to be used. Therefore grid 45 constitutes a modified Mercator's (or cylindrical) projection of meridians and parallels having successive parallels of latitude equally spaced, so as to provide an average ratio between the scale of latitude and that of longitude. Grid 45 is therefore usable, subject to a negligible error factor, only within relatively narrow limits of latitude on the earth's surface, but the scale is the same for each area of the grid so that when board 40 is moved from right to left or left to right, the negligible error does not vary.

Latitude scale 42 is measured and delineated along central meridian 41, subdividing each interval between adjacent parallels 48 into tenths. Comparable latitude scales 44 may, if desired, be provided along other meridians for convenience in measuring latitude in adjacent areas of scale 45 which are not so calibrated. Longitude scale 47 is measured and delineated along central parallel 46, subdividing each interval between adjacent meridians 43 into tenths. If desired, the sixth parallel 48 on either side of central parallel 46 and every sixth meridian 43, counting from central meridian 41, may be indicated by lines heavier than adjacent parallels of meridians as an aid in determining the latitude and longitude of points plotted on plotting board 40.

As previously mentioned herein, plotting board 40 is usable with negligible error only within determinable limits of geographical latitude. Therefore, when it is desired to use the navigational plotting device of my invention in latitudes which are substantially higher or lower than those for which a given grid 45 of plotting board 40 has been constructed as previously described, then an alternative plotting board 40 must be provided which has a grid 45 of slightly different configuration. Alternative plotting boards 40 are preferably formed with the same general configuration as that of the board 40 shown in Fig. 6, except that the alternative grid 45 delineated thereon is constructed with a different ratio between the respective scales of latitude and longitude. The ratio between latitude and longitude must correspond (in the manner described hereinbefore) to that ratio which exists adjacent a central parallel of latitude which passes through a Mercator's (or cylindrical) projection of that area of the earth's surface over which the alternative plotting board 40 is intended to be used.

It will be apparent to those skilled in the art that variations, such as those described above, in the ratio between the scales of latitude and longitude provided on alternative plotting boards 40 may be achieved by varying either or both of the intervals between adjacent parallels and/or the intervals between adjacent meridians on alternative plotting grids 45 so as to achieve the desired ratio.

Since the length of the equal interval (previously described) between adjacent reference lines 29 of disk 20 (Figs. 1 and 4) is determined by the scale of latitude of the plotting board 40 with which disk 20 is used, I prefer to provide identical latitude scales on each alternative plotting board 40 and to vary the scale of longitude on each alternative plotting board in order to achieve the desired ratio between the respective scales of latitude and longitude. By thus providing the same scale of latitude on each alternative plotting board 40, a single disk 20 having reference lines scaled to the common scale of latitude can be used interchangeably with any of the alternative plotting boards. Therefore, when my preferred embodiment is used in substantially higher or lower latitudes it is necessary to replace only the plotting board 40 with an alternative plotting board, usable with the common disk 20 and having a different ratio between the scales of latitude and longitude of its grid 45.

It should be noted that while lines 29 indicate equal intervals of approximately five minutes of latitude, parallels 48 indicate intervals of approximately ten minutes of latitude. Meridians 43 are spaced at intervals approximately ten minutes of longitude.

Plotting board 40 is positioned superadjacent disk member 20 and is slidably retained in such position by means of a plurality of guide posts 50 described hereafter.

Guide posts 50 are preferably formed with the general configuration shown in Fig. 7 having head 52, annular groove 51 adjacent head 52, spacer portion 54 and depending threaded portion 53. Groove 51 is formed with dimensions sufficient to slidably receive one of the opposite edges 49 (Fig. 1) of board 40. Spacer portion 54 (Fig. 2) is sufficiently long to support board 40 above plate 10, disk 20 and apex 31 of pivot bolt 30. Guide posts 50 are suitably positioned upon plate 10 for cooperating to frictionally engage opposite edges 49 of board 40 intermediate their respective annular grooves 51 and are secured in such positions by suitable nuts 55 so as to retain board 40 in position above disk 20 and plate 10 and to permit board 40 to be slidably repositioned only along the line of the central parallel 46 so that any value of longitude can be registered with apex point 31. It should be noted that the azimuth scale 13 which is delineated on plate 10 is shown as graduated only in 10 degree intervals. The scale is in practice graduated in degrees, but the lines indicating the degree intervals are omitted on the drawings of Figures 1 and 3 in order that the drawings may not be confused by the multiplicity of lines.

*Operation*

In the operation of my device, a hypothetical "assumed position" of the navigator is first determined in whole degrees of latitude and degrees and minutes of longitude, in accordance with the usual practice in celestial navigation, from the latest available navigational information. Secondly, central parallel 46 (Fig. 6) is designated as the parallel of latitude of the assumed position by erasably marking the latitude of the assumed position (i.e. to the nearest whole degree) on the upper surface of board 40, adjacent parallel 46. The sixth parallel 48 above and below central parallel 46 may for convenience be similarly designated as the next higher and next lower whole degrees of latitude, respectively. Similarly, central meridian 41 and every sixth adjacent meridian 43 are designated as indicating the appropriate successive whole degrees of longitude within which the longitude of the assumed position is included.

Plotting board 40 is then slidably repositioned eastwardly or westwardly with respect to azimuth scale 13 (to the left or right, respectively, in Fig. 1) to bring the point on longitude scale 47, which corresponds to the exact minute of longitude of the assumed position, into register with apex 31 of bolt 30.

Following well known navigational procedures, the azimuth and altitude data for a suitable heavenly body (based upon the latitude and longitude of the assumed position of the navigator at a known time) are then determined from navigation tables. The actual altitude of the heavenly body is next determined by observation with a suitable instrument such as a bubble sextant. An intercept value is then determined. The intercept value is the difference between hypothetical range of the body and the observed range. The hypothetical range is the distance between a point on the earth's surface directly beneath the body and the assumed position of the navigator at the time of the observation as obtained from navigation tables. The observed (or actual) range is the distance between the point on the earth's surface directly beneath the body and the actual position of the navigator at the time of the observation as computed from the observational data as measured by an instrument such as a bubble sextant. The intercept value is thus determined by the usual methods of computation, from the known altitude of the celestial body obtained from navigation tables for the assumed position, and from the observed altitude of the body at the actual position of the navigator.

Disk 20 is then rotated about pivot bolt 30 until azimuth indicator 26 is in register with that point on scale 13 which corresponds to the azimuth bearing of the heavenly body with respect to the assumed position, such azimuth bearing being determined from navigation tables. When disk 20 is thus positioned, indicator lines 29 represent alternative possible "lines of position" of the navigator (i.e. possible lines on the earth's surface on one of which the actual position of the navigator is located). These possible lines of position are spaced at five minute (five nautical miles) intervals, either toward or away from (computed by conventional methods) the body observed, with respect to the assumed position represented by apex 31 of bolt 30. The location of the actual line of position of the navigator, with respect to the assumed position 31, is then determined by applying the intercept correction (previously computed) measured along index line 25, either toward or away from (per computation) azimuth indicator 26 with respect to apex 31. An erasable mark or point is then made on plotting board 40 at the point along line 25 which is intersected by the actual line of position.

An erasable line is then drawn on the upper surface of plotting board 40 which passes through the point just marked or indicated. Such erasable line on board 40 extends from index line 25, along one or between adjacent parallel indicator lines 29 so as to be in register with one or parallel to adjacent lines 29 on disk 20.

Observations of one or more other celestial bodies are made from substantially the same actual position and corresponding actual lines of position are plotted (with reference to the same assumed position), in a manner substantially as previously described, on the upper surface of plotting board 40. If a sufficient number of intersecting actual lines of position are so plotted to form a triangle or other closed polygon, additional lines are constructed geometrically which bisect each angle of the polygon and mutually intersect at a point either within or without the polygon. Such point of mutual intersection is the "suggested position" of the navigator at the time the bodies were observed, and its location in degrees and minutes of latitude and longitude are determined by reference to scales 42 and 47, respectively, of plotting board 40.

I may refine the "suggested position" so computed, by applying well known rhumb line and Coriolis corrections (usually obtained from tables). To do this, disk 20 is rotated until one end of central indicator line 27 (now serving as a track indicator line) is in register with scale 13 at a point corresponding to the course of the "track made good" which is the path over which the craft has travelled in arriving at the present position. The path is computed by well known methods. Plotting board 40 is then slidably moved transversely of disk 20 to a position where the "suggested position" point previously plotted on the upper surface of board 40 is exactly in register with track indicator line 27 or one of its parallels (i.e. range lines 29). Following the usual practice, the magnitude of a combined Coriolis and rhumb line correction is determined in nautical miles from suitable tables and is applied to the previously plotted "suggested position." To do so, I plot a "final and corrected fix" along a line constructed perpendicular to track indicator 27 at the "suggested position," displaced to the right or left of line 27 (as indicated by the computed correction) by the magnitude of the correction as measured on the scale of the interval between indicator lines 29, allowing five minutes of latitude (equivalent to five nautical miles) for each interval between adjacent lines 29.

It will be apparent to those trained in the art that disk 20 may be formed, if desired, of material other than transparent material such as I provide in the preferred embodiment of my invention described herein without departing from the scope of my invention. One method of doing this is to provide that the locations of the azimuth scale 13 and the azimuth index be reversed to form an alternative embodiment of my invention wherein azimuth scale 13 is delineated upon disk 20 and is progressively numbered. This numbering would customarily progress in a counterclockwise direction with respect to disk 20 so as to cooperate with suitable indicia, such as for example indicator 26 delineated upon plate 10, for indicating the degree of orientation of lines 27 and 29 with respect to a grid such as grid 45 of a cooperating plotting board.

Other methods include: (1) providing a partial scale on plate 10 outside of the disk 20 and (2) making the disk 20 with a diameter smaller than the width of the plate 10.

Among the many advantageous uses for my device in the celestial navigation of aircraft are the following: (a) it affords means for plotting, on an expanded scale, a celestial fix which may then be transferred to a chart of smaller scale and greater area for purposes of comparison and/or continuity; (b) it affords means for computing celestial fixes in the confined environment of single place aircraft where the use of conventional charts is impractical; (c) it provides a compact means for cross-checking navigational computations in multi-place aircraft; (d) it provides an instrument for use by navigation instructors to rapidly check the technique of students using conventional navigational computing means; (e) it provides means for rapidly and accurately computing a "Most Probable Position" (known to navigators as MPP) when plotting sunlines; and (f) it is equally effective as an instrument for celestial navigation by the polar grid system as well as other systems which are commonly used.

It is to be understood that the above described embodiments of my invention are for purposes of illustration only and various changes may be made therein without departing from the spirit and scope of my invention.

I claim:

1. A navigational instrument for rapidly computing and plotting an accurate celestial fix in terms of the exact latitude and longitude of the observer comprising a base plate having an azimuth scale delineated thereon; a disk member pivotally secured to said plate having an azimuth index line diametrically disposed thereon, having a track indicator line disposed diametrically of said disk and perpendicular to said azimuth index line, and having a plurality of reference lines parallel to said track indicator line and spaced along said azimuth index line at equal intervals from said track indicator line; and a transparent plotting board slidably secured to said plate, having one surface thereof divided into a plurality of identical rectangular areas, by means of a central parallel disposed across said surface, a central meridian disposed across said surface perpendicular to said central parallel, a plurality of meridians disposed parallel to said central meridian and a plurality of parallels of latitude disposed parallel to said central parallel, superadjacent said disk member, and repositionable transversely of said disk member.

2. A navigational instrument for rapidly computing and plotting an accurate celestial fix in terms of the exact latitude and longitude of the observer comprising a base plate; a disk member pivotally secured to said plate, having an azimuth scale delineated thereon, having an azimuth index line diametrically disposed thereon, having a track indicator line disposed diametrically of said disk and perpendicular to said azimuth index line, and having a plurality of reference lines parallel to said track indicator line and spaced along said azimuth index line at equal intervals from said track indicator line; and a transparent plotting board slidably secured to said plate having one surface thereof divided into a plurality of identical rectangular areas, by means of a central parallel disposed across said surface, a central meridian disposed across said surface perpendicular to said central parallel, a plurality of meridians disposed parallel to said central meridian and a plurality of parallels of latitude disposed parallel to said central parallel, superadjacent said disk member, and repositionable transversely of said disk member.

3. A navigational instrument for rapidly computing and plotting an accurate celestial fix in terms of the exact latitude and longitude of the observer comprising a base plate; an azimuth scale secured to said plate; a plotting board formed of transparent material, positioned superadjacent said azimuth scale, slidably secured to said plate and having a rectangular grid delineated thereon; and a disk member formed of transparent material, pivotally secured to said plate intermediate said plate and said plotting board, and rotatable about said azimuth scale, said disk having delineated thereon a plurality of parallel lines and a diametral line perpendicular to said parallel lines.

4. A navigational instrument for rapidly computing and plotting an accurate celestial fix in terms of the exact latitude and longitude of the observer comprising a base plate; a plotting board formed of transparent material, positioned superadjacent said plate, slidably secured thereto, and having a rectangular grid delineated thereon; and a disk member pivotally secured to said plate intermediate said plate and said plotting board, said disk having delineated thereon a plurality of parallel lines, a diametral line perpendicular to said parallel lines and an azimuth scale.

5. A navigational instrument for rapidly computing and plotting an accurate celestial fix in terms of the exact latitude and longitude of the observer comprising a base plate member; a disk member rotatably secured to said plate member, one of said members having a plurality of parallel lines delineated thereon, said lines being interspaced at predetermined equal intervals and having a diametral line perpendicular to said parallel lines and one of said members having an azimuth scale delineated thereupon; a rectangular plotting board disposed superadjacent said disk member; said plotting board being slidably secured to said plate member and repositionable diametrically of said disk member, and having a rectangular grid of predetermined proportions delineated thereon; and means associated with said disk member for indicating the position of the rotational axis of said disk member with respect to said rectangular grid.

6. An instrument for celestial navigation for rapidly computing and plotting an accurate celestial fix in terms of the exact latitude and longitude of the observer comprising a base plate; a rectangular plotting board formed of transparent material having one surface thereof divided into a plurality of identical rectangular areas; means for retaining said plotting board superadjacent said base board while permitting said plotting board to be slidably repositioned along its longitudinal axis; and a transparent disk member, pivotally secured to said base plate intermediate said base board and said plotting board, said member having an azimuth index line diametrally disposed thereon, a track indicator line disposed diametrally of said disk and perpendicular to said azimuth index line, and a plurality of reference lines parallel to said track indicator line and spaced along said azimuth index line at equal intervals from said track indicator line.

7. An instrument for celestial navigation for rapidly computing and plotting an accurate celestial fix in terms of the exact latitude and longitude of the observer comprising a base plate; a rectangular plotting board formed of transparent material having one surface thereof divided into a plurality of identical rectangular areas; means for slidably retaining said plotting board superadjacent said base board; a transparent disk member, pivotally secured to said base plate intermediate said base board and said plotting board, said member having an azimuth index line diametrally disposed thereon, a track indicator line disposed diametrally of said disk and perpendicular to said azimuth index line, and a plurality of reference lines parallel to said track indicator line and spaced along said azimuth index line at equal intervals from said track indicator line; and means associated with said disk member for indicating the pivotal axis thereof.

8. An instrument for celestial navigation for rapidly computing and plotting an accurate celestial fix in terms of the exact latitude and longitude of the observer comprising a base plate having an azimuth scale delineated thereon; a rectangular plotting board formed of transparent material having one surface thereof divided into a plurality of rectangular areas, by means of a central parallel disposed across said surface, a central meridian disposed across said surface perpendicular to said central parallel, a plurality of meridians disposed parallel to said central meridian and a plurality of parallels of latitude disposed parallel to said central parallel and intersecting said central meridian; means comprising a plurality of guide posts secured to said plate for retaining said plotting board superadjacent said base board while permitting said plotting board to be slidably repositioned along its longitudinal axis; and a transparent disk member, pivotally secured to said base plate intermediate said base board and said plotting board, said member being rotatable concentrically about said azimuth scale, said member having an azimuth index line disposed thereon, a track indicator line disposed perpendicular to said azimuth index line, and a plurality of reference lines parallel to said track indicator line and spaced along said azimuth index line at equal intervals of predetermined magnitude.

9. An instrument for celestial navigation for rapidly computing and plotting an accurate celestial fix in terms of the exact latitude and longitude of the observer comprising a base plate having an azimuth scale delineated thereon; a rectangular plotting board formed of transparent material having one surface thereof divided into a plurality of rectangular areas, by means of a central parallel disposed across said surface, a central meridian disposed across said surface perpendicular to said central parallel, a plurality of meridians disposed parallel to said central meridian and a plurality of parallels of latitude disposed parallel to said central parallel and intersecting said central meridian; means comprising a plurality of guide posts secured to said plate for retaining said plotting board superadjacent said base board while permitting said plotting board to be slidably repositioned along its longitudinal axis; a transparent disk member, pivotally secured to said base plate intermediate said base board and said plotting board, said member being rotatable concentrically about said azimuth scale, said member having an azimuth index line disposed thereon, a track indicator line disposed perpendicular to said azimuth index line, and a plurality of reference lines parallel to said track indicator line and spaced along said azimuth index line at equal intervals of predetermined magnitude; and means associated with said disk member for indicating the pivotal axis of said disk member.

10. An instrument for celestial navigation for rapidly computing and plotting an accurate celestial fix in terms of the exact latitude and longitude of the observer comprising a base plate having an azimuth scale delineated thereon; a rectangular plotting board formed of transparent material having one surface thereof divided into a plurality of identical rectangular areas, by means of a central parallel disposed across said surface, a central meridian disposed across said surface perpendicular to said central parallel, a plurality of meridians disposed parallel to said central meridian and a plurality of parallels of latitude disposed parallel to said central parallel; means for retaining said plotting board superadjacent said base board while permitting said plotting board to be slidably repositioned along its longitudinal axis; and a transparent disk member, pivotally secured to said base plate intermediate said base board and said plotting board, said member being rotatable concentrically about said azimuth scale, said member having an azimuth index line diametrally disposed thereon, a track indicator line disposed diametrally of said disk and perpendicular to said azimuth index line and a plurality of reference lines parallel to said track indicator line and spaced along said azimuth index line at equal intervals from said track indicator line.

11. An instrument for celestial navigation for rapidly computing and plotting an accurate celestial fix in terms of the exact latitude and longitude of the observer comprising a base plate having an azimuth scale delineated thereon; a rectangular plotting board formed of transparent material having one surface thereof divided into a plurality of identical rectangular areas, by means of a central parallel disposed across said surface, a central meridian disposed across said surface perpendicular to said central parallel, a plurality of meridians disposed parallel to said central meridian and a plurality of parallels of latitude disposed parallel to said central parallel; means for retaining said plotting board superadjacent said base board while permitting said plotting board to be slidably repositioned along its longitudinal axis; a transparent disk member, pivotally secured to said base plate intermediate said base board and said plotting board, said member being rotatable concentrically about said azimuth scale, said member having an azimuth index line diametrally disposed thereon, a track indicator line disposed diametrally of said disk and perpendicular to said azimuth index line and a plurality of reference lines parallel to said track indicator line and spaced along said azimuth index line at equal intervals from said track indicator line; and means for indicating the center of rotation of said disk member.

12. An instrument for celestial navigation for rapidly computing and plotting an accurate celestial fix in terms of the exact latitude and longitude of the observer comprising a base plate having an azimuth scale delineated thereon; a rectangular plotting board formed of transparent material having one surface thereof divided into a plurality of identical rectangular areas, by means of a central parallel disposed across said surface, a central meridian disposed across said surface perpendicular to said central parallel, a plurality of meridians disposed parallel to said central meridian and intersecting said central parallel at equal intervals measured from said central meridian and a plurality of parallels of latitude disposed parallel to said central parallel and intersecting said central meridian at equal intervals measured from said central parallel said intervals intermediate said meridians bearing a ratio to said intervals intermediate said parallels of latitude which is equal to that ratio which exists between the average magnitude of a division of longitude and the average magnitude of a comparable division of latitude on a Mercator's projection of a predetermined area of the earth's surface; means for retaining said plotting board superadjacent said base board while permitting said plotting board to be slidably repositioned along its longitudinal axis; and a transparent disk member, pivotally secured to said base plate intermediate said base board and said plotting board, said member being rotatable concentrically about said azimuth scale, said member having an azimuth index line diametrally disposed thereon, a track indicator line disposed diametrally of said disk and perpendicular to said azimuth index line, and a plurality of reference lines parallel to said track indicator line and spaced along said azimuth index line at equal intervals from said track indicator line.

13. An instrument for celestial navigation for rapidly computing and plotting an accurate celestial fix in terms of the exact latitude and longitude of the observer comprising a base plate having an azimuth scale delineated thereon; a rectangular plotting board formed of transparent material having one surface thereof divided into a plurality of identical rectangular areas, by means of a central parallel disposed across said surface, a central meridian disposed across said surface perpendicular to said central parallel, a plurality of meridians disposed parallel to said central meridian and intersecting said central parallel at equal intervals measured from said central meridian and a plurality of parallels of latitude disposed parallel to said central parallel and intersecting said central meridian at equal intervals measured from said central parallel, said intervals intermediate said meridians bearing a ratio to said intervals intermediate said parallels of latitude which is equal to that ratio which exists between the average magnitude of a division of longitude and the average magnitude of a comparable division of latitude on a Mercator's projection of a predetermined area of the earth's surface; means for retaining said plotting board superadjacent said base board while permitting said plotting board to be slidably repositioned along its longitudinal axis; a transparent disk member, pivotally secured to said base plate intermediate said base board and said plotting board, said member being rotatable concentrically about said azimuth scale, said member having an azimuth index line diametrally disposed thereon, a track indicator line disposed diametrally of said disk and perpendicular to said azimuth index line, and a plurality of reference lines parallel to said track indicator line and spaced along said azimuth index line at equal intervals from said track indicator line; and means for indicating the location of the pivotal axis of said disk member.

References Cited in the file of this patent

UNITED STATES PATENTS

| | | |
|---|---|---|
| 1,098,621 | Gist | June 2, 1914 |
| 2,027,368 | Bockius | Jan. 14, 1936 |
| 2,235,177 | Stark | Mar. 18, 1941 |
| 2,779,538 | Shanhouse | Jan. 29, 1957 |

FOREIGN PATENTS

| | | |
|---|---|---|
| 859,739 | France | Sept. 16, 1940 |